United States Patent [19]

Cairenius

[11] 4,168,740
[45] Sep. 25, 1979

[54] HEAT TRANSFERRING WALL PANELS

[76] Inventor: Runo M. J. Cairenius, 195 Kennedy Rd. S., Suite 309, Brampton, Ontario, Canada

[21] Appl. No.: 857,682

[22] Filed: Dec. 5, 1977

[30] Foreign Application Priority Data

Dec. 7, 1976 [CA] Canada ................................. 267275

[51] Int. Cl.$^2$ ........................... F24H 9/08; F28F 9/02
[52] U.S. Cl. ....................................... 165/49; 165/174
[58] Field of Search ................. 165/49, 170, 174, 135; 62/523

[56] References Cited

U.S. PATENT DOCUMENTS

| | | | |
|---|---|---|---|
| 2,312,451 | 3/1943 | Strike | 165/170 X |
| 2,641,449 | 6/1953 | Antony | 165/49 |
| 2,864,251 | 12/1958 | Imbrogno et al. | 165/49 X |
| 3,145,707 | 8/1964 | Thomsson | 126/271 |
| 3,305,003 | 2/1967 | Rothschild | 165/135 X |
| 4,003,363 | 1/1977 | Grossman | 165/170 |
| 4,066,121 | 1/1978 | Kleine et al. | 165/174 |

FOREIGN PATENT DOCUMENTS 1097233  2/1955  France ..................................... 165/170

Primary Examiner—Carlton R. Croyle
Assistant Examiner—Richard E. Gluck

[57] ABSTRACT

This invention is a heating and cooling wall panel that accomplishes heating by radiating to bodies in a space thermal energy from a source of warmed water delivered to the panel at low pressure, and cools bodies in a space by absorbing thermal energy radiated to the panel from those bodies and passing the heat thus gained to a cooled fluid also delivered at low pressure. The heat transfer by this panel is accomplished when only small temperature differentials exist between the fluid and the space owing to the extreme thinness of the radiating-cum-absorbing panel face.

5 Claims, 3 Drawing Figures

U.S. Patent  Sep. 25, 1979  4,168,740
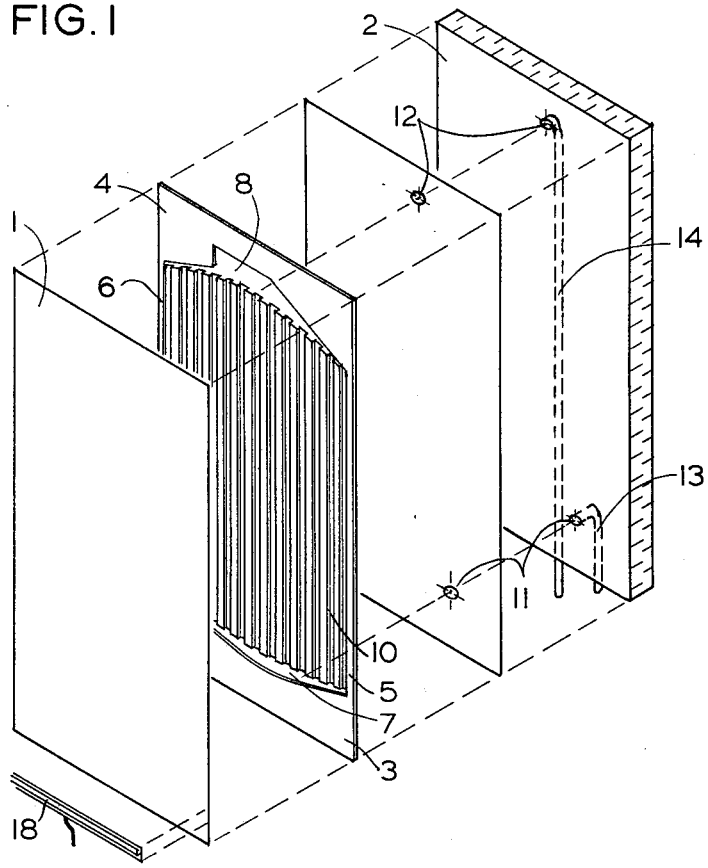
FIG. 1
FIG. 2
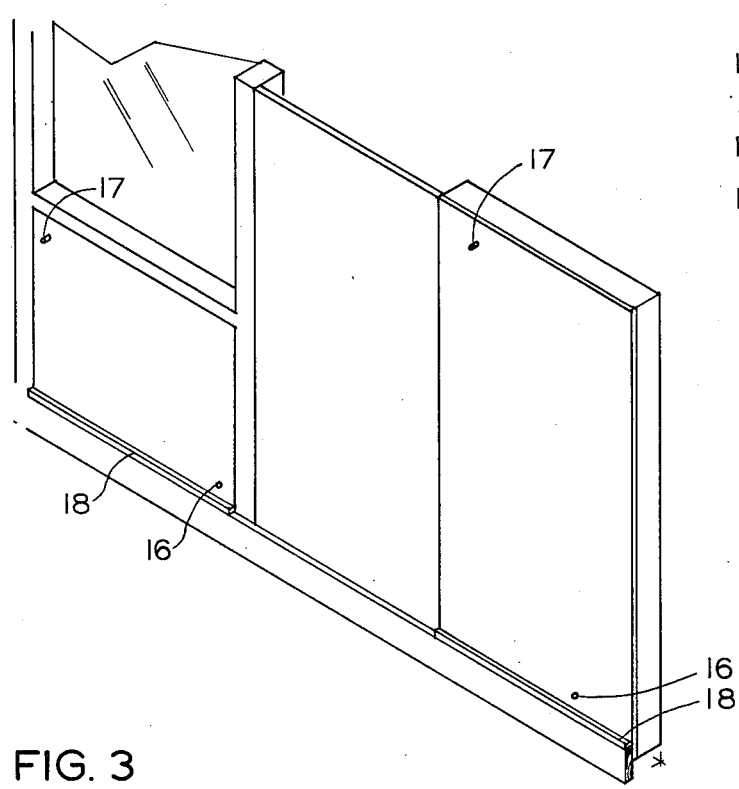
FIG. 3

HEAT TRANSFERRING WALL PANELS

BACKGROUND OF THE INVENTION

This invention is a heat transferring device that serves the function of radiating heat, and the additional function of absorbing heat radiated to it.

The most prevelent application of this invention is envisioned as that of heating and cooling an environment for human comfort as part of a system wherein warm or cool fluid is furnished this panel at low pressure.

Hitherto, hydrant heat transferring panels have been made either by embedding conduit in a building structure, or applying panels with built-in conduit. In either case the enclosed fluid passes through conduit in a serpentine or tortuous path transferring heat to the surrounding mass from which it either radiates or passes into the air in the space to be conditioned, thence finally to bodies in that space. Due to the numerous media, including in most cases finishing materials, through which the heat must be transferred, and to the considerable mass which must be affected, a relatively great temperature diferential between the fluid and the space is required, and the response to desired temperature is slow. Slow response is not only an incovenience in itself, but tempts the user to exaggerate the setting of his thermostat to speed up the response, causing the mass of the panel to overreact. The result of this human phonomenon is to expand an excess of energy, and accomplish a widely fluctuating temperature.

Such panels, in their complexity, offer difficulty in their construction, often manifest in high incidence of deficiency in manufacture, and unjustified expence. The nature of this serpentine or tortuous path used in such panels is such to offer excessive resistance to the flow of the enclosed fluid thereby rendering such panels inappropriate to applications where an efficient heat exchange is sought to be accomplished by a fluid at low pressure and low temperature differential to the space to be effected.

Experience has shown that with the passage of time clogging may occur within such panels obstructing the fluid flow and rendering the entire panel inoperative.

There can be little doubt that the difficulties besetting current radiant heating panels, the inconvenience of frustratingly prolonged response time, and the widely fluctuating temperatures arising therefrom, combined with the inordinate expense involved are largely the reason why hydrant radiant panels are not in widespread use. This, despite the fact that heating and cooling by radiation is the most comfortable and, theoretically, most efficient system known.

SUMMARY OF THE INVENTION

The idea in the present invention is to have as a wall surface a thin sheet of thermally conductive material, the back side of which is in contact with a thermally conditioned fluid contained in a shallow chamber through which the fluid may be caused to flow freely in an essentially direct path along the back face of this conductive sheet; thus transferring heat by conduction between the fluid and the wall surface, and transferring heat by radiation between the wall surface and bodies present in the space adjacent to that surface. The conductive sheet can be secured to an insulative sheet at the back of the fluid chamber at the perimeter of said chamber, and within the chamber by fixings which do not unduely interfere with the essentially direct path of the fluid flow, thus making the whole a rigid sandwich panel.

It is the object of the present invention to provide a practical, efficient and economical means of effecting a thermally controlled environment, such as for human comfort in an architectural space, utilizing a fluid at low pressure and temperature differential to that sought to be maintained in that environment.

Other object of this invention are to provide a device which in accomplishing the foregoing will effect a rapid response to change in temperature of the input fluid, and provide a means of lowering the humidity of air present in said environment when this device is used to accomplish cooling.

Further objects of this invention are to provide a device which is itself an architectural wall finish; is simple in design, construction and operation; offers ease of installation and maintenance; conserves energy; and provides a practical means of availing existing buildings to wanted cooling, heating and insulation.

In this invention the radiating sheet in being a thin thermal conductor will rapidly transfer heat from one surface to the other without having to heat an inordinate mass in the process, thus the transfer of heat between the fluid and the wall surface is efficiently accomplished even when the temperature differential between the fluid and the wall surface is slight. The thinness of this radiating sheet is only limited by structural considerations, and thus can be very thin indeed if secured to the sheet at the back of the fluid chamber at regular intervals thus becoming a member of a trussed sandwich panel. The trussing element introduced into the fluid chamber need not interfere to any great extend with the free flow of the fluid within the chamber, and will not so do if the members of said element are aligned along the essentially direct path of the fluid flow. This element can itself be a thermal conductor and fixed to the radiating sheet in such a manner as to facilitate the transfer of heat between the fluid passing along said element and the radiating sheet. Whereas there exist in this sandwich panel no significant obstructions to the free flow of conditioned fluid, such fluid may flow with only slight resistance through the chamer thus facilitating the use of this device in systems of low pressure supply.

A further feature of this construction is that in providing between the trussing elements a multitude of essentially parallel passage through the fluid chamber it is ensured that the potential clogging of some of these passages, although decreasing the efficiency of the panel's operation, permits the fluid to continue to flow through those passages which remain open, therefore the panel remains in operation.

The application of this invention to heat a space does so predominantly by radiation thereby directing a greater heating effect upon bodies within that space than upon the ambient air, a condition known to be more conductive to human comfort than that where bodies are heated indirectly by warm air, as is the case with most systems utilizing convection.

When used to cool a space this invention does so primarily by absorbing heat radiated from bodies within that space producing a situation known in the art to be one of comfort. A further contribution to comfort results from a lowering of the humidity of the space when this invention is used to accomplish cooling, by the simple device of collecting and disposing of moisture condensed upon the wall surface of the panel.

The wall surface of this invention can be such as to prevent an appearance which is esthetically pleasing and which serves as the architectural finish, thereby eliminating the possible need of applying additional finish materials.

From the foregoing it should be appearent that application of the present invention overcomes numerous objections heretofore encumbering the general acceptance of hydrant radiant panels as a practical means of economically providing heating and cooling.

In the following explanatory description of this invention reference is made to the accompanying drawings, to wit:

FIG. 1 is an exploded isometric view of the basic heat transfering panel.

FIG. 2 is a sectional view of the ends of the heat transferring panel cut along the input and output conduits showing a ball valve controlling one conduit and a bleed screw fitted at the uppermost part of the fluid chamber.

FIG. 3 is an isometric view illustrating the heat transferring panels as wall panels in typical installation with valves and bleed srews fitted. The panel shown on the right of the illustration is a panel flush mounted in a wall of conventional construction, shown on the left is a panel with weather resistant outer facing used as an element in a curtainwall installation.

Its is considered that the most advantageous application of the idea embodied in this invention is to be found in heat radiating and absorbing panels constructed as follows:

A shallow fluid chamber, shaped approximately as a parallelepiped, is formed between a thin thermally conductive sheet 1 at the front, a thermally insulative sheet 2 at the back, bounded by strips 3 and 4 at the ends, and strips 5 and 6 at the sides, the thickness of these strips being essentially the depth of the fluid chamber. The fluid chamber thus formed can be considered as consisting of three functional portions: an inlet manifold 7 at one end; an outlet manifold 8 at the opposite end; and a core 9 occupying the space between said manifolds 7 and 8.

In operation the flow of fluid contained in the chamber can be in either direction, and the use in this specification of the terms "inlet" and "outlet" is only for clarity of description.

The inlet manifold 7 is provided with an inlet orifice 11, preferably located in the insulative sheet 2 tangential to the end strip 3, thus being at the outer limit of the fluid chamber. The outlet manifold 8 is provided with an outlet orifice 12 similar to the inlet orifice 11 but located at the opposite end of the fluid chamber.

The inlet orifice 11 connects with the inlet conduit 13, preferably contained within the insulative sheet 2 wherein it may be run to a location at the base of the panel where suitable connection can be made to the fluid supply. The outlet orifice 12 may similarly connect with the outlet conduit 14 preferably contained within the insulative sheet 2 wherein it may also run to the base of the panel and suitable connection, thus allowing all required piping external to the panel to be easily made and concealed behind applied baseboard.

Within the core 9, elements 10 can be fixed to the conductive sheet 1 and the insulative sheet 2 in such a manner as to not unduely hinder the flow of fluid in an essentially direct path from the inlet manifold 7 to the outlet manifold 8, thus combining the elements 10 with the sheets 1 and 2 in a structural system forming a rigid sandwich panel.

All materials embracing the fluid are of necessity impervious and joined to form a fluid tight enclosure Either thermoplastics or thermosetting plastics can be utilized for this purpose, as can other materials, such a metals.

In the design here illustrated, said core elements 10 are regularly corrugated sheet of conductive material with the passages formed by its introduction between the two sheets 1 and 2 essentially parallel and alignec with the essentially direct path between the manifolds 7 and 8.

In this design the ends of the core elements 10 are shaped parabolically as a means of providing uniform fluid flow across the width of the panel; and the cross sectional area of the manifold 7 and 8 is progressively reduced, in proportion to the distance away from the orifices 11 and 12 by increasing the width of the strips 3 and 4. Another design which accomplishes uniform fluid flow uses a rectangular corrugated core element with the flute frequency diminishing proportionally to the distance from the line drawn between the orifices 11 and 12, but other suitable connections can be used.

Similarly, suitable structural elements may be introduced into the manifold portions 7 and 8 of the fluid chamber, with their alignment such as to facilitate uniform distribution of the input fluid to the core 9, but are not here illustrated.

An impervious sheet 15 may be interposed between the fluid chamber and the insulative sheet 2 becoming the back of the fluid chamber. In this case orifices 11 and 12 are provided in the sheet 15 at the locations as described in the foregoing. This sheet 15 acts to balance the thermal expansion of the conductive sheet 1, and permits the use of porous material for the insulative sheet 2.

If desired, a valve 16 may be introduced into either the inlet or the outlet conduit, 13 or 14, or both, as a control and may be incorporated within the panel with valve control at wall surface.

Also, if desired, an additional orifice may be introduced into the uppermost manifold, preferably in the conductive sheet 1 at the highest point of the fluid chamber and a bleed screw 17 fitted to facilitate purging the system of air.

A trough 18 may be provided near the base of the conductive sheet 1 to collect moisture condensed from the present air when the panel is accomplishing cooling; and wall surface may be treated to facilitate the gravitational descent of the condensate.

Applications of the idea embodied in this invention are legion; among them are use as ceiling panels, collectors of solar radiant energy, applications to cold storage, to provide a thermally controlled table or counter surface in vegetable display, hot or cold food counters.

I claim:

1. Heat transferring wall panels, each comprising
a thermally conductive sheet of impervious material at the front,
an impervious thermally insulative sheet having one inlet and one outlet orifice at the back,
end strips and side strips of imprevious material between and bonded to said sheets forming with said thermally conductive sheet and said impervious sheet a hollow core for heat exchange fluid, a corrugaged element within said core, said corrugated element having flutes parallel to sides of said sheets and bonded to said sheets, inlet and outlet manifolds within said core at opposite ends of the corrugated element adjacent said inlet and outlet orifices, conduit means communicating through said inlet and outlet orifices in said impervious sheet at the back with said manifolds, whereby heat is exchanged, predominantly by radiation, between thermally conditioned fluid contained in said core and bodies present in close proximity.

2. Heat transferring wall panels according to claim 1 wherein said impervious thermally insulative sheet comprises of an impervious sheet having one inlet orifice and one outlet orifice and thermally insulative sheet adhered to said impervious sheet.

3. Heat transferring wall panels according to claim 2 wherein said corrugated element is shaped to have flute surface area that substantially diminishes in proportion to distance away from center line parallel to corrugations of said corrugated sheet.

4. Heat transferring wall panels according to claim 2 wherein said thermally conductive sheet has a trough with closed ends and is near and substantially parallel to lower edge of said thermally conductive sheet and thereto affixed, thus forming an open vessel to collect condensate from said thermally conductive sheet.

5. Heat transferring wall panels according to claim 2 wherein said inlet conduit includes a valve with body of said valve occupying a position within said insulative sheet and with control shaft of said valve passing through said back and front sheets and said end strip, whereby access is made available to said control shaft at the front, and said thermally insulative sheet has affixed to it an air purging device at highest point of said outlet manifold.

* * * * *